United States Patent [19]

Villarreal

[11] Patent Number: 4,751,827
[45] Date of Patent: Jun. 21, 1988

[54] FAN AIR COOLER

[76] Inventor: Moises F. Villarreal, 1007 Ave. R, Del Rio, Tex. 78840

[21] Appl. No.: 128,714

[22] Filed: Dec. 4, 1987

[51] Int. Cl.[4] ............................................. F25D 17/04
[52] U.S. Cl. ........................................ 62/406; 62/426; 62/430; 62/434; 62/530
[58] Field of Search ................ 62/406, 426, 530, 430, 62/434

[56] References Cited

U.S. PATENT DOCUMENTS

| | | | |
|---|---|---|---|
| 662,541 | 11/1900 | Miskolczy | 62/406 X |
| 682,872 | 9/1901 | Jobson | 2/460 |
| 1,874,843 | 8/1932 | Adler, Jr. | 62/426 |
| 1,889,686 | 11/1932 | McKee | 2/460 |
| 1,902,246 | 3/1933 | Kitchen | 2/460 |
| 1,934,551 | 12/1933 | Meysenburg | 2/460 |
| 2,067,004 | 1/1937 | Spengler | 62/406 X |
| 2,119,338 | 5/1938 | Mills | 2/460 |
| 2,464,522 | 3/1949 | McDonald | 2/460 |
| 2,841,964 | 7/1958 | Anderson | 62/426 |
| 3,774,410 | 11/1973 | Hans | 62/406 X |
| 4,612,774 | 9/1986 | Budreau | 62/406 X |

Primary Examiner—Lloyd L. King
Attorney, Agent, or Firm—Jerry T. Kearns

[57] ABSTRACT

A fan air cooler for attachment to a conventional electric fan consists of a grid of spaced strips filled with a frozen fluid material. The strips may have spaced fluid sacks which may resemble ice cubes. The connecting strips between the fluid filled sacks may comprise plastic strips, fluid filled tubes or helical fluid filled tubes. A top marginal portion of the grid is provided with grommets for receipt over hooks which are secured to a top edge of the fan housing. The hooks may be attached to the fan housing magnetically, adhesively or by VELCRO. In addition to cooling air by passing the air between the frozen fluid filled strips, the fan air cooler also cools the air by virtue of thermodynamic expansion of the air through spaced air passage apertures.

8 Claims, 3 Drawing Sheets

FAN AIR COOLER

BACKGROUND OF THE INVENTION

1. Field of the Invention

The present invention relates to air coolers, and more particularly pertains to a new and improved fan air cooler for attachment to conventional electric fans. Various types of elaborate and expensive air conditioning systems are available. The present invention provides a simple, inexpensive device which may be easily attached to existing electric fans. The device of the present invention is reusable, and may be easily refrozen by placement in a conventional home freezer.

2. Description of the Prior Art

Various types of air cooling devices are known in the prior art. A typical example of such an air cooling device is to be found in U.S. Pat. No. 682,872, which issued to F. Jobson on Sept. 17, 1901. This patent discloses an air cooling and ventilating apparatus for railroad cars. The device passes incoming air through a filtration system and through a bed of crushed ice before admitting the cooled air to the interior of the railroad car. U.S. Pat. No. 1,889,686, which issued to H. McKee on Nov. 29, 1932, discloses a device for refrigerating the interior of a delivery van. The device passes air through spaced beds of crushed ice and through heat exchanger tubes cooled by the water dripping from the melting ice. U.S. Pat. No. 1,902,246, which issued to F. Kitchen on Mar. 21, 1933, discloses an air cooling device which circulates the water melting from blocks of ice through heat exchanger tubes. Air is then blown across these heat exchanger tubes by an electric fan. U.S. Pat. No. 2,119,338, which issued to B. Mills on May 31, 1938, discloses a device for cooling air which utilizes frozen carbon dioxide to cool a heat exchange fluid medium. An electric fan is utilized to circulate air through heat exchanger tubes in contact with the fluid medium. U.S. Pat. No. 1,934,551, which issued to F. Meysenburg on Nov. 7, 1933, discloses an air cooling device which utilizes frozen carbon dioxide as a heat exchange medium to cool air driven through a heat exchange grid by an electric fan. U.S. Pat. No. 2,464,522, which issued to L. McDonald on Mar. 15, 1949, discloses a refrigerator cooled by frozen carbon dioxide and ice. The device utilizes a double walled cooling jacket which is filled with dry ice and water ice.

While the above mentioned devices are suited for their intended usage, none of these devices provide a fan air cooler which may be easily retrofitted to existing electric fans. Additionally, none of the aforesaid prior art devices provide a grid of fluid filled tubes adapted to be frozen and secured across the face of an electric fan. An additional feature of the present invention, not contemplated by the previously described prior art devices, is the provision of helical coils filled with frozen fluid and adapted to be secured to the face of an electric fan. Inasmuch as the art is relatively crowded with respect to these various types of fan air coolers, it can be appreciated that there is a continuing need for and interest in improvements to such fan air coolers, and in this respect, the present invention addresses this need and interest.

SUMMARY OF THE INVENTION

In view of the foregoing disadvantages inherent in the known types of air cooling devices now present in the prior art, the present invention provides an improved fan air cooler. As such, the general purpose of the present invention, which will be described subsequently in greater detail, is to provide a new and improved fan air cooler which has all the advantages of the prior art air cooling devices and none of the disadvantages.

To attain this, representative embodiments of the concepts of the present invention are illustrated in the drawings and make use of a fan air cooler for attachment to a conventional electric fan which consists of a grid of spaced strips filled with a frozen fluid material. The strips may have spaced fluid sacks which resemble ice cubes. The connecting strips between the fluid filled sacks may comprise plastic strips, fluid filled tubes or helical fluid filled tubes. A top marginal portion of the grid is provided with grommets for receipt over hooks which are secured to a top edge of the fan housing. The hooks may be attached to the fan housing magnetically, adhesively or by VELCRO. In addition to cooling air by passing the air between the frozen fluid filled strips, the fan air cooler also cools the air by virtue of thermodynamic expansion of the air through spaced air passage apertures.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fan air cooler which has all the advantages of the prior art air cooling devices and none of the disadvantages.

It is another object of the present invention to provide a new and improved fan air cooler which may be easily and efficiently manufactured and marketed.

It is a further object of the present invention to provide a new and improved fan air cooler which is of a durable and reliable construction.

An even further object of the present invention is to provide a new and improved fan air cooler which is susceptible of a low cost of manufacture with regard to both materials and labor, and which accordingly is then susceptible of low prices of sale to the consuming public, thereby making such fan air coolers economically available to the buying public.

Still yet another object of the present invention is to provide a new and improved fan air cooler which provides in the apparatuses and methods of the prior art some of the advantages thereof, while simultaneously overcoming some of the disadvantages normally associated therewith.

Still another object of the present invention is to provide a new and improved fan air cooler which utilizes a grid of strips filled with a frozen fluid material adapted for attachment to existing electric fans.

Yet another object of the present invention is to provide a new and improved fan air cooler which is of an inexpensive construction and may be quickly and easily attached to existing electric fans.

Even still another object of the present invention is to provide a new and improved fan air cooler which provides a double cooling effect by expanding air through spaced apertures and forcing air into contact with spaced strips filled with a frozen fluid material.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
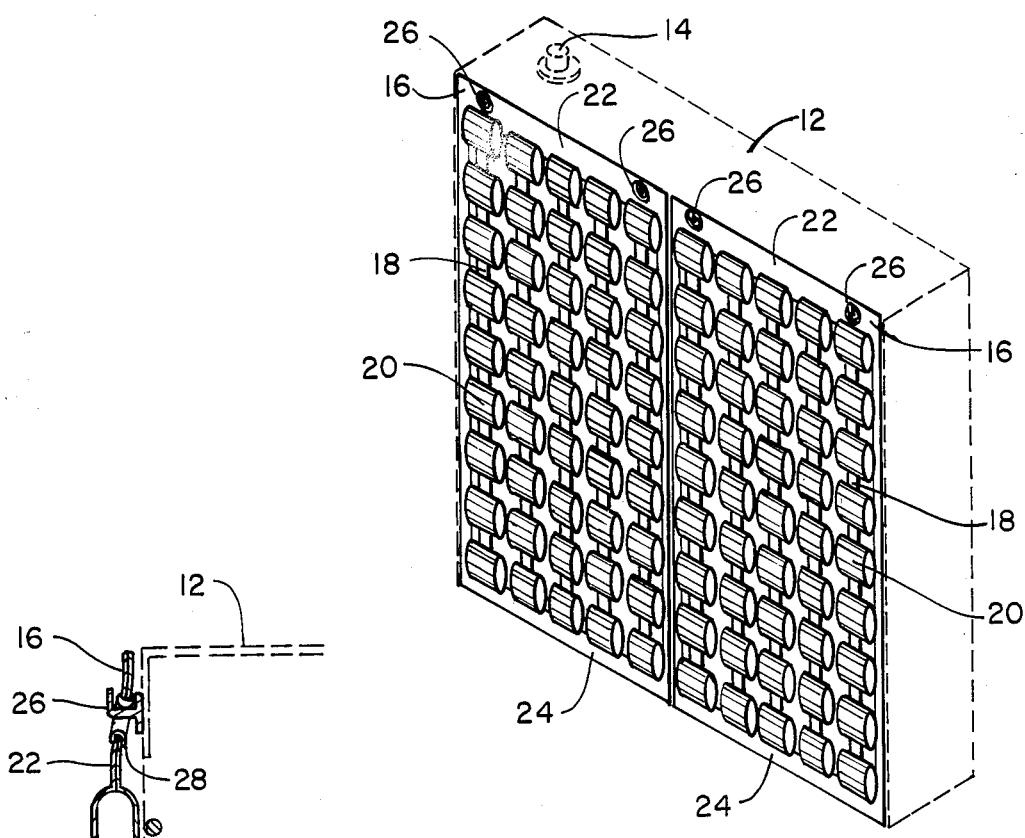
FIG. 1 is a perspective view of a fan air cooler according to a first embodiment of the present invention.

With reference now to the drawings, and in particular to FIG. 1 thereof, a new and improved fan air cooler embodying the principles and concepts of the present invention and generally designated by the reference numeral 10 will be described.

More specifically, it will be noted that the first embodiment 10 of the invention includes a conventional electric fan 12 with a control switch 14. The fan 12 may be of the widely utilized type which has an approximately twenty inch square front face. A pair of grids 16 are removably attached to the front face of the fan 12. Each grid 16 has a top marginal edge 22 and a bottom marginal edge 24. A plurality of spaced vertical strips 18 extend between the top marginal edge 22 and the bottom marginal edge 24. An array of spaced fluid filled cubical sacks 20 are supported on the strips 18. The strips 18 may be formed as flat plastic strips heat welded to the sacks 20, or may be formed as hollow tubes in fluid communication with each of the sacks 20 on the particular strip 18. The grids 16 are preferably formed from a tough flexible plastic material so that the grids 16 may be rolled and inserted into a conventional home freezer. The fluid medium within the sacks 20 and strips 18 may be water or other conventional liquids and gels having enhanced freezing characteristics. The fluid medium should be non-toxic so as to prevent injury to small children in the event that they chew through the plastic grids 16. By virtue of the two piece construction of the fan air cooler 10 of the present invention, the grids 16 may easily be inserted into the freezer section of conventional home refrigerators.

Figure 2:
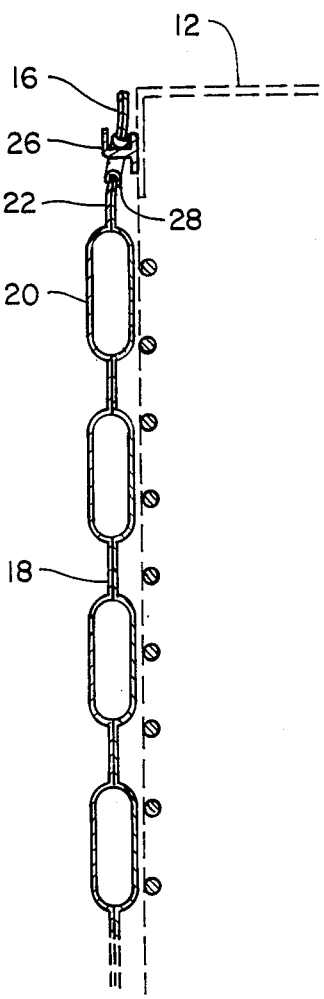
FIG. 2 is a partial cross sectional view of the fan air cooler according to the first embodiment of the present invention.

With reference now to FIG. 2, an example attaching arrangement for securing the grids 16 on the front face of the fan 12 will now be described. A plurality of hooks 26 may be secured along the top edge of the fan 12 magnetically, adhesively or through the use of VELCRO fasteners. A plurality of grommets 28 are spaced along the top marginal edge 22 of each of the grids 16 for cooperation with the hooks 26. In this fashion, the grids 16 may be conveniently suspended on the front face of the fan 12. In use, the frozen grids 16 are removed from the freezer, and suspended on the front face of the fan 12. The fan is then turned on, thus forcing air through the apertures between the strips 18 and sacks 20. The air will expand while passing through the apertures, thus achieving a thermodynamic cooling effect. Additionally, the flow of the air across the sacks 20 will provide an additional cooling effect.

Figure 3:
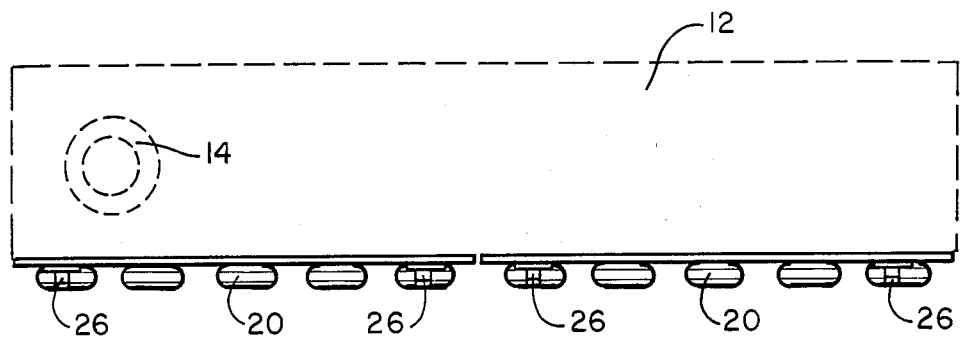
FIG. 3 is a top view of the fan air cooler according to the first embodiment of the present invention.

In FIG. 3, a top view is provided which illustrates the positioning of the attaching hooks 26 along the top edge of the fan 12.

Figure 4:
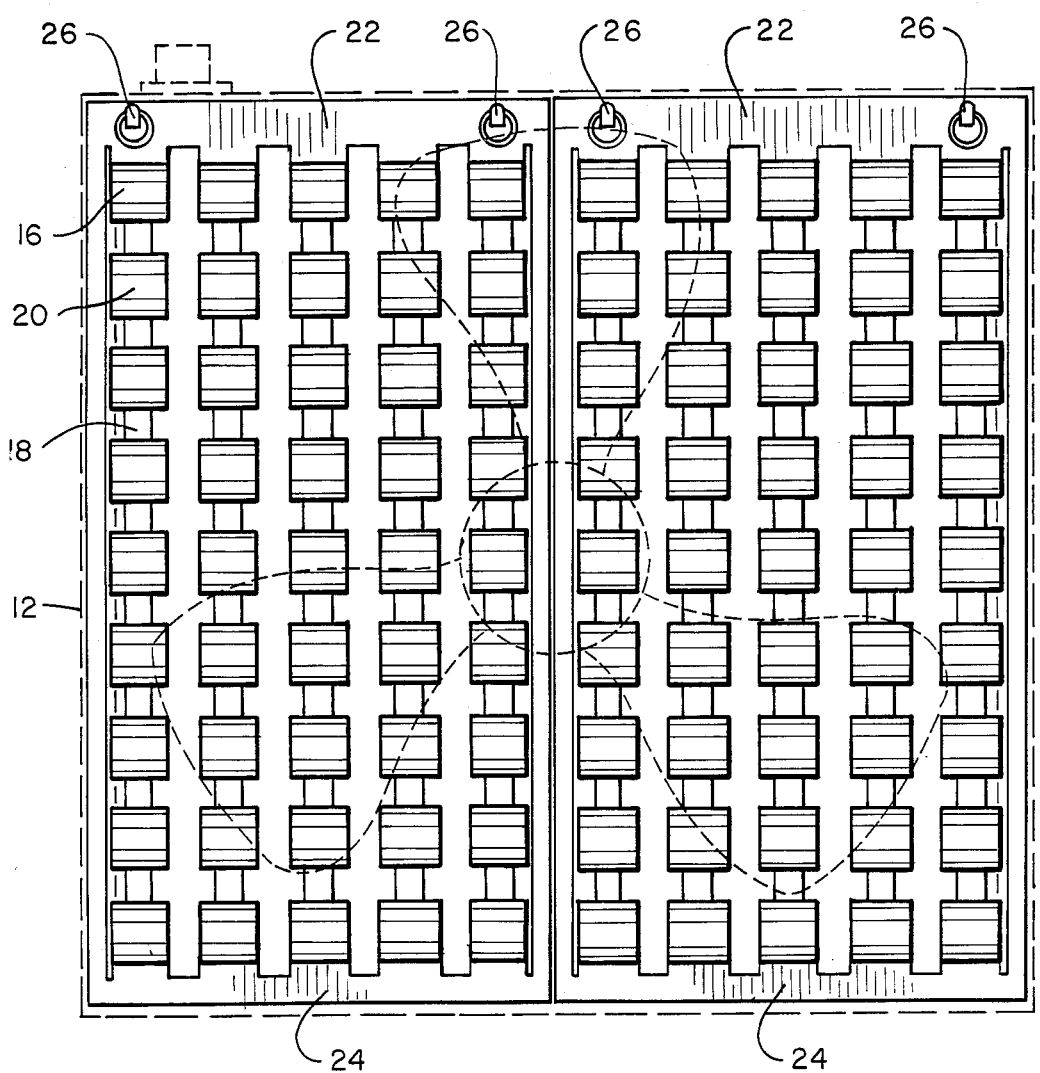
FIG. 4 is a front view of the fan air cooler according to the first embodiment of the present invention.

As shown in FIG. 4, the grids 16 are suspended across the entire face of the fan 12.

Figure 5:
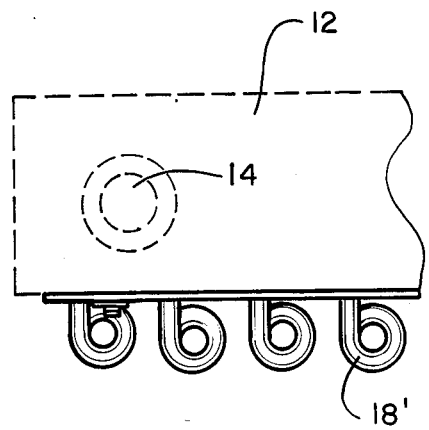
FIG. 5 is a partial top view of a fan air cooler according to a second embodiment of the present invention.

In FIG. 5, a partial top view is provided of a second, alternative embodiment of the fan air cooler of the present invention. This embodiment utilizes connecting tubes 18' which are formed as hollow helical coils filled with frozen fluid material.

Figure 6:
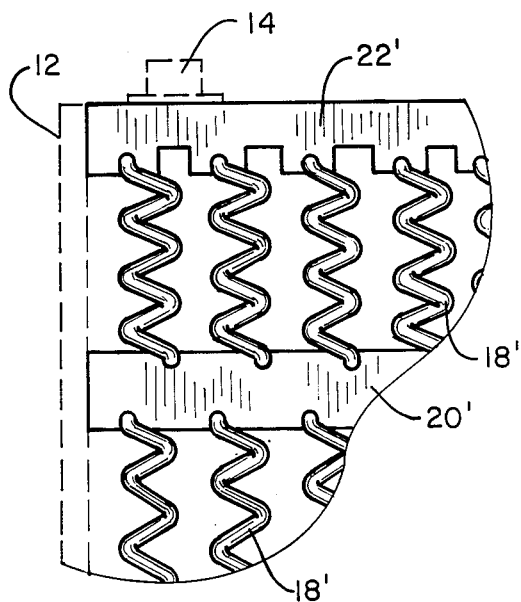
FIG. 6 is a partial front view of a fan air cooler according to a second embodiment of the present invention.

As shown in the partial front view of FIG. 6, the helical coils 18' are attached to, and in fluid communication with a plurality of spaced fluid filled cubical sacks 20'.

Figure 7:
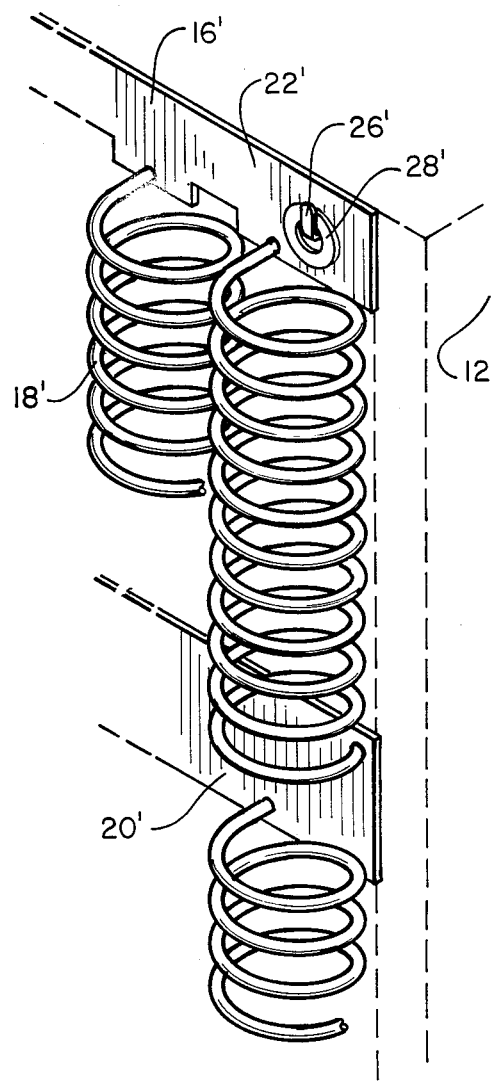
FIG. 7 is a partial perspective view of a fan air cooler according to a second embodiment of the present invention.

In FIG. 7, it may be seen that the fluid filled helical tubes 18' provide an enhanced surface area to provide a larger degree of heat transfer with air forced between the coils of the tubes 18' by the electric fan 12. The grids 16' of the second embodiment of the present invention are secured in a similar fashion as that described with reference of the first embodiment of the present invention. A plurality of grommets 28' are spaced along the top middle edge 22' of the grids 16'. Cooperating hooks 26' are secured along the top edge of the fan 12. In use, one set of grids 16' may be secured to the face of the fan 12, while a second set of grids 16' is being refrozen in the freezer. Thus, when the fluid material within the grids 16' becomes sufficiently thawed so as to reduce the cooling effects, the grids 16' are merely exchanged with the second set of frozen grids 16' in the freezer. Through this technique, the air may be constantly and inexpensively cooled without resorting to expensive and complicated air conditioning devices.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved fan air cooler for attachment over a front face of an electric fan, comprising:
   a pair of grids;
   each of said grids having a top marginal edge portion and a bottom marginal edge portion;
   securing means on said top marginal edge portion for securing said grid on said front face of said fan;
   a plurality of horizontally spaced elongated vertical strips extending between said top and bottom marginal edge portions;
   air flow apertures between said strips;
   a plurality of sacks spaced vertically along the length of each of said strips; and
   each of said sacks filled with a material which may be frozen in a conventional home freezer and thawed at room temperature.

2. The fan air cooler of claim 1, wherein said securing means comprises a plurality of grommets spaced along said top marginal edge and a plurality of hooks having means for spaced attachment along a top edge of said front face of said fan.

3. The fan air cooler of claim 1, wherein said grids are constructed from a tough flexible plastic material.

4. The fan air cooler of claim 1, wherein said strips comprise hollow tubes in fluid communication with said sacks.

5. The fan air cooler of claim 4, wherein said strips comprise hollow helical tubes.

6. The fan air cooler of claim 1, wherein said sacks are cubical.

7. A new and improved fan air cooler for attachment over a front face of an electric fan, comprising:
   a pair of grids formed from a tough flexible plastic material;
   each of said grids having a top marginal edge portion and a bottom marginal edge portion;
   a plurality of hooks having means for spaced attachment along a top edge of said front face of said fan;
   a plurality of grommets spaced along said top marginal edge portion of each of said grids, said grommets adapted to removably engage said hooks;
   a plurality of horizontally spaced vertical elongated strips extending between said top and bottom marginal edge portions;
   a plurality of cubical sacks spaced along the length of each of said strips;
   said strips being hollow and in fluid communication with said sacks;
   each of said strips and sacks filled with a material which may be frozen in a conventional home freezer and thawed at room temperature; and
   vertically elongated air flow apertures formed between said strips.

8. A new and improved fan air cooler for attachment over a front face of an electric fan, comprising:
   a pair of grids formed from a tough flexible plastic material;
   each of said grids having a top marginal edge portion and a bottom marginal edge portion;
   a plurality of hooks having means for spaced attachment along a top edge of said front face of said fan;
   a plurality of grommets spaced along said top marginal edge portion of each of said grids, said grommets adapted to removably engage said hooks;
   a plurality of horizontally spaced vertical elongated strips extending between said top and bottom marginal edge portions;
   a plurality of cubical sacks spaced along the length of each of said strips;
   said strips formed from hollow helical tubes in fluid communication with said sacks;
   each of said strips and sacks filled with a material which may be frozen in a conventional home freezer and thawed at room temperature; and
   vertically elongated air flow apertures formed between said strips.

* * * * *